United States Patent [19]

Douds et al.

[11] Patent Number: 4,947,595
[45] Date of Patent: Aug. 14, 1990

[54] EXTRUDED DECKING HAVING COOLING FEATURE

[75] Inventors: Willard O. Douds, Indianapolis; James A. Kiphart, Greenfield, both of Ind.

[73] Assignee: Metalmark Corporation D/B/A Midamerica Extrusions, Indianapolis, Ind.

[21] Appl. No.: 350,010

[22] Filed: May 10, 1989

[51] Int. Cl.$^5$ .............................................. B44D 5/08
[52] U.S. Cl. ........................................ 52/177; 52/732; 52/738
[58] Field of Search ................ 52/730, 732, 177, 665, 52/738, 480; 296/181, 182

[56] References Cited

U.S. PATENT DOCUMENTS

| D. 200,775 | 4/1965 | Horn. | |
|---|---|---|---|
| 2,718,288 | 9/1955 | Boyer | 52/730 X |
| 3,080,021 | 3/1963 | Muir | 296/182 X |
| 3,425,181 | 2/1969 | Barainsky | 52/480 |
| 3,555,762 | 1/1971 | Costanzo, Jr. . | |
| 4,266,381 | 5/1981 | Deller | 52/177 |

*Primary Examiner*—Carl D. Friedman
*Attorney, Agent, or Firm*—Barnes & Thornburg

[57] ABSTRACT

An extruded metal plank for use in the construction of deck surfaces is disclosed along with certain supporting structure for the plank. The metal plank includes a horizontal element having an upper surface, a lower surface, and two parallel edges defining outer boundaries of the upper surface. Two side elements depend from the lower surface contiguous to the two parallel edges for defining the sides of the plank. At least one supporting element depends from the horizontal element lower surface, each supporting element including a horizontal projection at a lower end of the element for supporting the plank. A plurality of additional elements depend from the horizontal element lower surface for maximizing the area of the lower surface to enhance heat transfer from the plank to the surrounding environment.

11 Claims, 2 Drawing Sheets

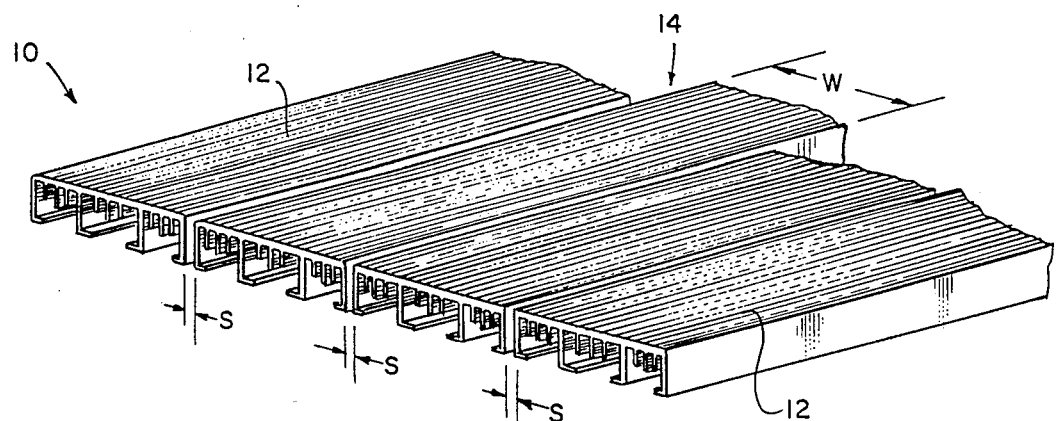
FIG. 1
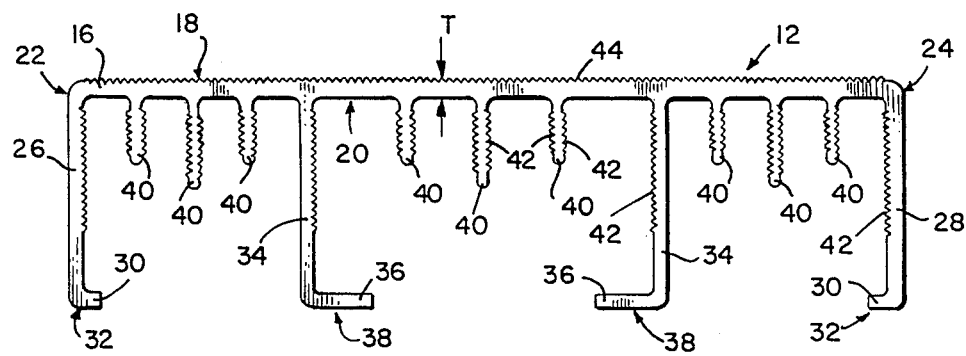
FIG. 2
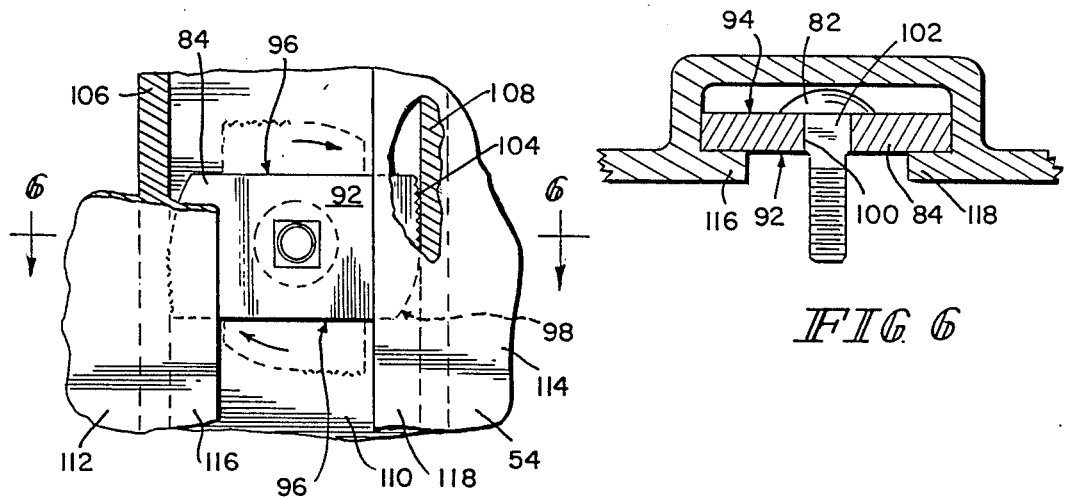
FIG. 5
FIG. 6

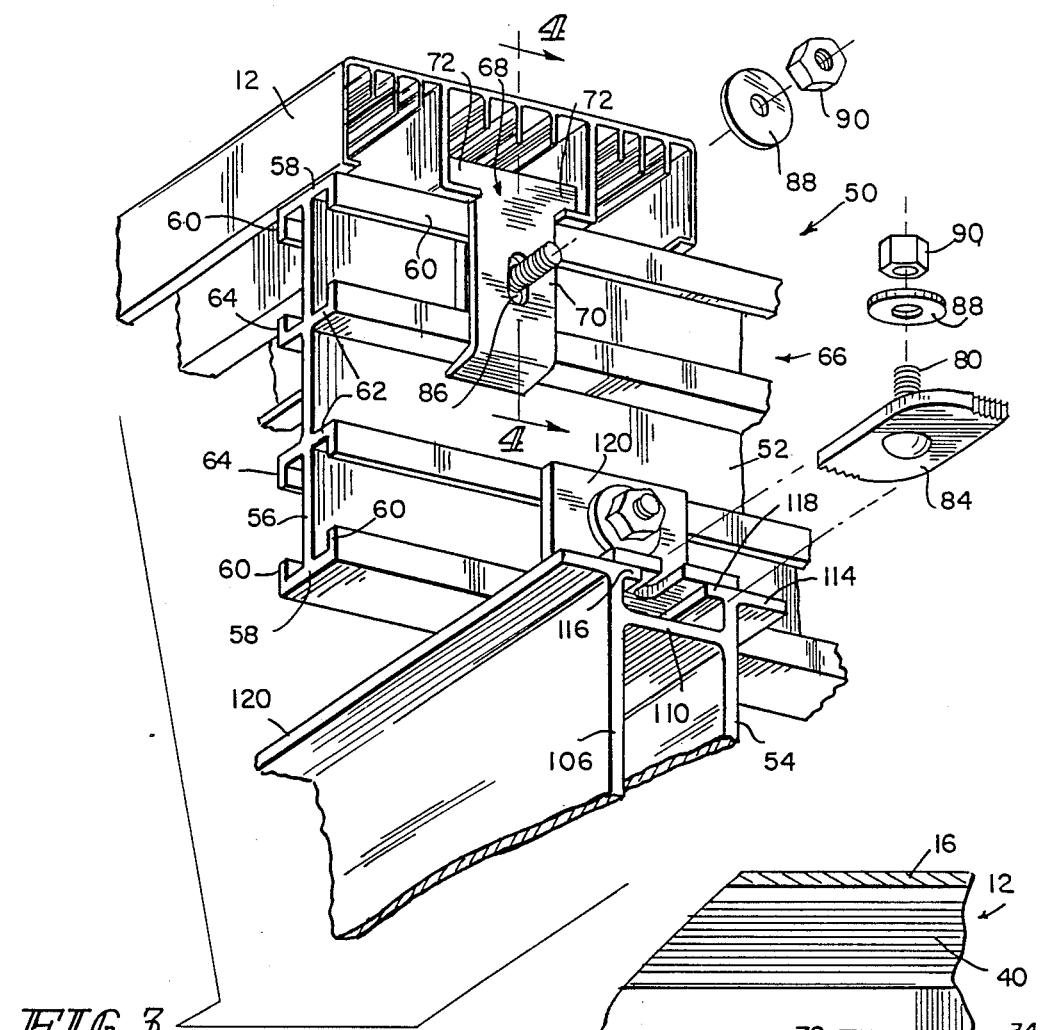
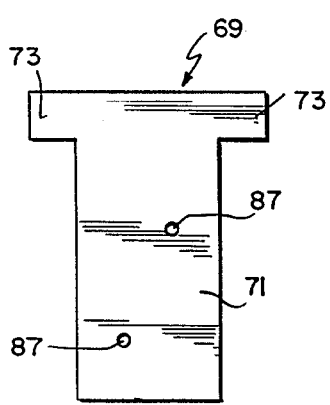
FIG. 3
FIG. 2
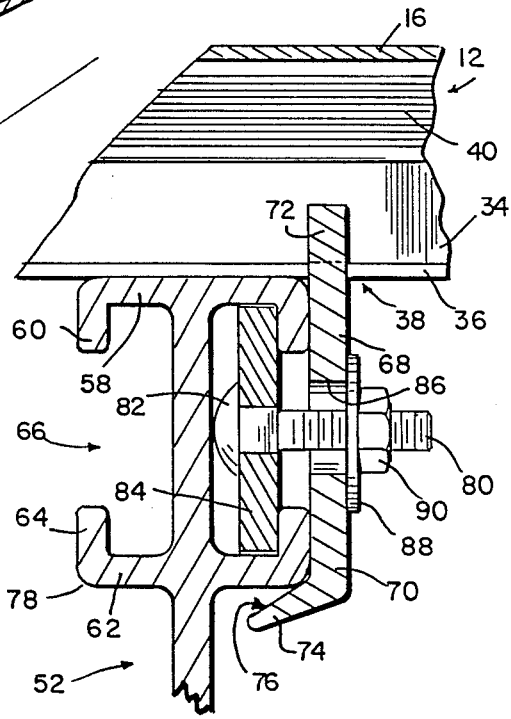
FIG. 4

EXTRUDED DECKING HAVING COOLING FEATURE

BACKGROUND OF THE INVENTION

This invention relates generally to decks, docks, platforms, and other outdoor extensions of residences and commercial buildings intended to support people in a pleasant and relaxing atmosphere. In particular, the invention pertains to extruded metal planks and other elements for use in the construction of such outdoor extensions, the extruded metal plank having particular features to ensure that the surface of the deck remains acceptably cool and esthetically pleasing.

Extruded metal flooring elements of various cross-sectional configuration have been employed in the construction of floors, cat walks, runways, and the like, particularly in manufacturing facilities where long-term durability is required. Such elements have also been used to construct multi-tier warehousing facilities as well as elevated floors in various indoor environments. Outdoor use of extruded metal flooring elements has generally been limited to situations where esthetics is not important.

On the other hand, the preferred material for the construction of virtually all recreational decks has been wood, particularly aromatic cedar, or certain pressure-treated woods which will repel or resist attack by termites or other biological agents. Wood is viewed as the preferred material since it has a "Natural" look and is generally lower in initial cost than extruded metal elements.

Both wood and metal decking, when exposed to direct sunlight in the heat of summer, often becomes uncomfortably, if not dangerously, hot. The upper surface of wood decking in bright sunlight can exceed the air temperature by 25° F. In the heat of summer, the surface temperature can be high enough to cause significant discomfort to persons contacting the decking with their bare skin. Metal decking typically suffers the additional disadvantages of having an unattractive appearance and exhibiting specular reflection of direct sunlight causing discomfort to ones eyes.

SUMMARY OF THE INVENTION

According to the present invention, an extruded metal plank is provided for use in the construction of decks, docks, and platforms which includes features intended to enhance the heat transfer from the plank to the surrounding environment by way of radiation and convection, thereby diminishing any surface temperature buildup which might otherwise occur when exposed to direct sunlight. The various surfaces of the plank may be treated electro-chemically or with various coatings designed to minimize solar absorption, promote heat transfer, and render an attractive appearance to the surface of the deck or other structure.

The metal plank includes a horizontal element having an upper surface and a lower surface, the horizontal element including two parallel edges defining the outer boundaries of the upper surface. A side element depends from the lower surface of the horizontal element contiguous to each of the two parallel edges so as to define the sides of the plank. At least one additional supporting element depends from the lower surface of the horizontal element for supporting the horizontal element with respect to any underlying structure. A plurality of additional elements depend from the horizontal element lower surface for maximizing the area of the lower surface to enhance heat transfer from the plank to its surroundings.

The thickness of the horizontal element of the plank is kept as thin as possible so that the temperature differential between the upper surface and lower surface is minimized. The plurality of additional elements take the form of fins which are serrated so as to present a very large surface area on the lower side of the plank thereby enhancing both the radiative and convective removal of heat from the plank.

The plank can further include a coating bonded to the surface of the plank to inhibit the formation of metal oxide on the surfaces so that heat transfer between the plank and the surrounding environment is not diminished. The coating present on at least the upper surface of the plank is substantially free of carbon black and carbon black-like constituents which would contribute to absorption or thermalization of any incident radiation. The upper surface also includes a non-skid surface pattern while the coating may include additives which may present an increased coefficient of friction so as to render the surface of the plank safer to walk on even in wet conditions.

The sectional dimensions and the shape of the depending elements of the plank are designed to minimize the errection time and thus labor cost required to construct a deck, dock, platform or the like. Planks of the present invention can be conveniently sized to replace currently used materials such as 2'×6' wood planks. Further, the thinness of the metal permits the planks to be easily cut with power saws yet the overall section design avoids any tinny sound when walked upon.

While the planks can be used with a wood substructure, a partly or totally metal substructure is preferred. Using the metal substructure of the present invention contributes to a fast installation and to ensuring that the thermal exchange properties of the deck surface are not defeated. In either case, the design of the planks has the advantage of removing any fasteners from the deck upper surface.

Additional features and advantages of the present invention will become apparent to those skilled in the art upon consideration of the following discussion of the accompanying figures which illustrate and exemplify the best mode of carrying out the invention as presently perceived.

BRIEF DESCRIPTION OF THE DRAWINGS

FIG. 1 is a perspective view of a deck surface instructed using the extruded metal planks of the present invention.

FIG. 2 is an end view of an extruded metal plank in accordance with the present invention.

FIG. 3 is a perspective view illustrating a preferred supporting structure for a deck constructed in accordance with the present invention.

FIG. 4 is a sectional view taken along line 4—4 of FIG. 3.

FIG. 5 is an elevation view partly broken away of the mechanical support system and fastener element in accordance with the present invention.

FIG. 6 is a sectional view taken along line 6—6 of FIG. 5.

FIG. 7 is an elevation view of an alternative anchor for use with a wood supporting structure.

DESCRIPTION OF PREFERRED EMBODIMENTS

A deck 10 in accordance with the present invention includes a plurality of extruded metal planks 12 of indefinite length situated in side by side relationship so as to define a generally coplanar upper surface 14. The planks are separated from each other by a spacing S which may be varied in accordance with the design of the particular deck involved. In general, the distance S is a very minor fraction of the width W of the planks 12. Each of the planks 12 includes a horizontal element 16 having an upper surface 18 and a lower surface 20. The outer boundary of the horizontal element 16 is defined by edges 22 and 24. Two side elements 26 and 28 depend from the lower surface 20 of the horizontal element 16 contiguous to the two parallel edges 22 and 24 to define the sides of the plank 12. Each of the side elements 26 and 28 includes an inwardly directed horizontal projection 30 having a lower surface 32 which together define the outer margin of a plank upon which the plank 12 is supported.

The plank 12 includes a pair of supporting elements 34 depending from the lower surface 20 of the horizontal element 16. Each supporting element 34 also includes a horizontal projection 36 having a lower surface 38 which is generally coplanar with lower surface 32 of side elements 26. The plank 12 further includes a plurality of additional elements 40 depending from the lower surface 20 of horizontal element 16 for maximizing the surface area of the lower surface of the plank 12 so as to enhance heat transfer from the plank 12 to the surrounding environment.

The exact pattern of the plurality of additional elements 14 is subject to certain choices of design and may be affected by the specific dimensions of side elements 26 and supporting elements 34 including flanges 30 and 36. The thickness T of the horizontal element 16 is desirably as thin as possible, consistent with the load considerations, so as to achieve a high rate of heat transfer from the upper surface 18 to the lower surface 20. For extruded aluminum, a thickness T of about ⅛ inch is adequate to provide the desired balance of strength and heat transfer required of the present invention. To further maximize the area of the lower surface, each of the additional elements 40 include serrations 42 on both sides of the depending element. The serrations 42 are also included on one side of the supporting elements 34 and side elements 28.

The top surface 18 of horizontal elements 16 can also include serrations 44 or other surface features designed to enhance the coefficient of friction for persons walking on the upper surface of a deck 10 constructed of planks 12 in accordance with this invention. The serrations or other surface features 44 additionally act to diminish any specular reflection from the upper surface 18 of the plank. This is further achieved by anodizing or bonding a coating to the surfaces of the plank which, in addition to other features, can be decorative in nature. The anodizing or bonded coating can be of color selected to blend with the environment.

Any bonded coating should be substantially free of carbon black and carbon black-like constituents which would contribute to thermal absorption of incident radiation. The coating preferably also prevents the formation of metal oxides on the surface of the extruded metal plank which can contribute to a thermal insulating layer which can act to trap heat within the metal plank. Particularly advantageous coatings are those which include a polyvinylidene fluoride resin base. Examples of such resin bases are those sold by Pennwalt Corporation under the Trademark KYNAR®, by PPG Industries, Inc., under the Trademark DURANAR®, and by Desoto, Inc. under the Trademark FLUROPAN®. One particularly advantageous coating is DURANAR® XLTS 52260.

A preferred utilization of the planks 12 is in combination with extruded metal substructure such as that disclosed in FIG. 3 which shows an extruded metal plank 12 in accordance with the present invention resting on a base 50 including a plurality of horizontally situated supporting members, one of which is illustrated as member 52. The members 52 can in turn be supported on beams 54 or other structures connecting the deck 10 to the underlying ground. The supporting member 52 is shown to include a central web 56 having a T-shaped capitol 58 on each end of the web. Each capitol includes serif-like flanges 60 extending parallel to the central web 56. The member 52 also includes a pair of bars 62 intersecting the central web 56, The bar 62 also including flanges 62 parallel to the web 56 and projecting toward the flanges 60 so as to define therebetween a space 66 for receiving a bolt head.

A generally T-shaped anchor 68 couples the plank 12 to the supporting member 52. The T-shaped anchor 68 can be seen to include a stem portion 70 and a top portion including extensions 72 the lower surface of which engages the top of flange 36 of extruded metal plank 12. As may be seen or clearly in FIG. 4, the lower end of stem 70 includes a foot portion 74 including an inclined inner surface 76 which contacts a shoulder 78 on bar 62. A bolt 80 having head 82 penetrates an retainer 84 captured between flanges 60 and 64 of supporting member 52. The bolt 80 penetrates the slot 86 in stem 70 and is engaged by washer 88 and nut 90.

As the nut 90 is tightened on bolt 80, the inclined surface 76 on the foot 74 of anchor 68 rides down shoulder 78 thereby increasing the force exerted by lateral extension 72 of the anchor 68 on flange 36. This increasing force tends the lock the lower surface 38 of the extruded plank 12 to the top of the capitol portion 58 of supporting member 52.

While the retainer 84 can have any shape which will permit its being received behind flanges 60 and 64, a particularly advantageous shape for retainer 84 is shown connecting horizontal supporting member 52 to the underlying 54. The retainer 84 is shown in detail in FIG. 5 and 6 to comprise a plate-like element having parallel faces 92 and 94 and having a perimeter in the general shape of a parallelogram. That is, the retainer 84 includes parallel sides 96 and ends 98 which are axially symmetric and shown to be arcuate in nature.

The arcuate character of ends 98 permits the rotation of retainer 84 from the position shown in FIG. 5 in phantom to the position shown in solid lines. It will be noted that the anchor 86 includes a hole 100 in the center of the element adapted to receive the square shank 102 of bolt 80. The end portions 98 of the retainer also include a serrated portion 104 which is intended to engage the walls defining the surrounding structure.

While the retainer can be used to secure the T-shaped anchor 68 to the horizontal supporting member 52, it is shown in FIGS. 3, 5, and 6 to also couple supporting member 52 to beam 54. Beam 54 is shown to include a pair of webs 106, 108 spaced from each other by end 110. Upper extensions of webs 106 and 108 include lateral flanges 112 and 114 including inwardly extending portions 116 and 118, respectively It will be noted that the inner edges of extensions 116 and 118 define a throat similar to that defined by flanges 60 and 64 of horizontally supporting member 52. The distance between the inwardly directed flanges 116 and 118 is such that edges 96 of anchor 94 can easily be inserted therethrough. As shown in FIG. 3, the supporting member 52 is actually coupled to the beam 54 by a right angle member 120.

A plank 12 in accordance with the present invention can be used in combination with the usual wood timbers to form a deck. When so used, a generally T-shaped anchor 69 as shown in FIG. 7 couples the plank 12 to the supporting member 52. The T-shaped anchor 69 can be seen to include a stem portion 71 and a top portion including extensions 73 the lower surfaces of which engage the top of flange 36 of extruded metal plank 12. Holes 87 are provided to receive nails or screws for securing the anchor 69 to the wood supporting timbers (not shown).

It will be appreciated by those skilled in the art that while the invention has been described in detail with reference to the illustrated preferred embodiments, variations and modifications exist within the scope and spirit of the invention as previously described and is defined in the following claims.

What is claimed is:

1. A deck comprising: a base including a plurality of horizontally situated supporting members and a plurality of planks fixed to the supporting members defining a surface of the deck, each of the planks comprising:
    an extruded metal unit including:
        a horizontal element having an upper surface, a lower surface, and two parallel edges defining outer boundaries of the upper surface,
        a plurality of supporting elements depending from the lower surface each of the plurality of supporting elements including a horizontal projection at a lower end of each element for supporting the plank with respect to the supporting members, and
        a plurality of additional elements depending from the lower surface for maximizing the area of the lower surface to enhance heat transfer from the plank to the surrounding environment,
        two of the plurality of supporting elements of each plank depending from the lower surface being contiguous to the two parallel edges, and a pair of additional supporting elements being situated between the supporting elements depending from the two parallel edges, the horizontal projections at a lower end of each additional supporting element being directed toward each other to form a throat; and
    a T-shaped anchor member including a head and a stem, the head being engaged in the throat with the stem extending downwardly therefrom adjacent to said supporting member, and means coupling the anchor member to the supporting member, to fix the horizontal projections at a lower end of each additional supporting element to said supporting members, the stem of the T-shaped anchor member including an inclined foot at a lower end thereof, the foot engaging a shoulder on the supporting member for biasing the plank downwardly against the supporting member.

2. The deck structure of claim 1 wherein the stem of the T-shaped anchor member includes an aperture receiving a bolt securing the anchor to the supporting member.

3. The deck structure of claim 1 wherein the stem of the T-shaped anchor member includes aperture means for receiving fasteners to secure the anchor to the supporting member.

4. The deck of claim 1 further comprising serrations on the upper surface of the horizontal element.

5. The deck of claim 1 further comprising serrations on at least one side of the plurality of supporting elements.

6. The deck of claim 1 further comprising serrations on the plurality of additional elements depending from the lower surface.

7. The deck of claim 1 wherein each of the plurality of supporting elements includes a horizontal projection at a lower end of each element.

8. The deck of claim 1 further comprising an anodized surface.

9. The deck of claim 1 further comprising a coating bonded to the surfaces of the plank to inhibit the formation of metal oxide on the surfaces so that heat transfer between the plank and the surrounding environment is not diminished.

10. The deck of claim 9 wherein the coating present on at least the upper surface of the horizontal element is substantially free of carbon black and carbon black-like constituents which would contribute to thermal absorption of incident radiation.

11. A deck comprising: a base including a plurality of horizontally situated supporting members and a plurality of planks fixed to the supporting members defining a surface of the deck, each of the planks comprising:
    an extruded metal unit including:
        a horizontal element having an upper surface, a lower surface, and two parallel edges defining outer boundaries of the upper surface,
        a plurality of supporting elements depending from the lower surface each of the plurality of supporting elements including a horizontal projection at a lower end of each element for supporting the plank with respect to the supporting members, and
        a plurality of additional elements depending from the lower surface for maximizing the area of the lower surface to enhance heat transfer from the plank to the surrounding environment,
        two of the plurality of supporting elements of each plank depending from the lower surface being contiguous to the two parallel edges, and a pair of additional supporting elements being situated between the supporting elements depending from the two parallel edges, the horizontal projections at a lower end of each additional supporting element being directed toward each other to form a throat;
    the supporting member comprising an extruded metal member including a central web, a T-shaped capital on each end of the central web, each capital including serif-like flanges extending parallel to the central web, and at least one bar extending on each side of the web including flanges projecting toward said serif-like flanges to define therebetween a space for receiving a bolt head.

* * * * *